US011298683B2

(12) United States Patent
McDaniel et al.

(10) Patent No.: US 11,298,683 B2
(45) Date of Patent: Apr. 12, 2022

(54) AQUEOUS METHODS FOR TITANATING A CHROMIUM/SILICA CATALYST

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); Eric D. Schwerdtfeger, Bartlesville, OK (US); Jeremy M. Praetorius, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 17 days.

(21) Appl. No.: 16/293,726

(22) Filed: Mar. 6, 2019

(65) Prior Publication Data

US 2019/0201872 A1    Jul. 4, 2019

Related U.S. Application Data

(62) Division of application No. 15/815,761, filed on Nov. 17, 2017, now Pat. No. 10,300,460.

(51) Int. Cl.
| | |
|---|---|
| *B01J 23/26* | (2006.01) |
| *B01J 35/10* | (2006.01) |
| *C08F 10/02* | (2006.01) |
| *B01J 37/02* | (2006.01) |
| *B01J 35/02* | (2006.01) |
| *B01J 37/03* | (2006.01) |
| *B01J 37/14* | (2006.01) |
| *B01J 21/06* | (2006.01) |
| *B01J 21/08* | (2006.01) |
| *C08F 4/18* | (2006.01) |
| *C08F 4/24* | (2006.01) |
| *C08F 10/00* | (2006.01) |
| *B01J 31/02* | (2006.01) |
| *B01J 31/34* | (2006.01) |
| *B01J 31/38* | (2006.01) |

(52) U.S. Cl.
CPC ............ *B01J 23/26* (2013.01); *B01J 21/063* (2013.01); *B01J 21/08* (2013.01); *B01J 35/023* (2013.01); *B01J 35/1019* (2013.01); *B01J 35/1023* (2013.01); *B01J 35/1042* (2013.01); *B01J 35/1047* (2013.01); *B01J 37/0203* (2013.01); *B01J 37/0207* (2013.01); *B01J 37/0209* (2013.01); *B01J 37/035* (2013.01); *B01J 37/14* (2013.01); *C08F 4/18* (2013.01); *C08F 4/24* (2013.01); *C08F 10/00* (2013.01); *C08F 10/02* (2013.01); *B01J 31/0212* (2013.01); *B01J 31/0274* (2013.01); *B01J 31/0275* (2013.01); *B01J 31/34* (2013.01); *B01J 31/38* (2013.01); *B01J 2231/12* (2013.01)

(58) Field of Classification Search
CPC .......... B01J 23/26; B01J 21/063; B01J 21/08; B01J 35/023; B01J 35/1019; B01J 35/1023; B01J 35/1042; B01J 35/1047; B01J 37/0203; B01J 37/0207; B01J 37/0209; B01J 37/035; B01J 37/14; C08F 4/18; C08F 4/24; C08F 10/00; C08F 10/02
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,041,224 A | 8/1977 | Hoff et al. |
| 4,206,297 A | 6/1980 | Hoff et al. |
| 4,301,034 A | 11/1981 | McDaniel |
| 4,339,559 A | 7/1982 | McDaniel |
| 4,345,055 A | 8/1982 | Hawley |
| 4,368,303 A | 1/1983 | McDaniel ............... C08F 10/00 502/232 |
| 4,402,864 A * | 9/1983 | McDaniel ............... C08F 10/00 502/171 |
| 4,501,885 A | 2/1985 | Sherk et al. |
| 4,547,557 A | 10/1985 | McDaniel ............... C08F 10/00 502/236 |
| 4,588,790 A | 5/1986 | Jenkins, III et al. |
| 4,794,096 A | 12/1988 | Ewen |
| 4,808,561 A | 2/1989 | Welborn, Jr. |
| 5,352,749 A | 10/1994 | DeChellis et al. |
| 5,436,304 A | 7/1995 | Griffin et al. |
| 5,565,175 A | 10/1996 | Hottovy et al. |
| 5,575,979 A | 11/1996 | Hanson |
| 5,576,259 A | 11/1996 | Hasegawa et al. |

(Continued)

FOREIGN PATENT DOCUMENTS

| | | | |
|---|---|---|---|
| EP | 0882740 A1 | 12/1998 | ............ C08F 10/00 |
| WO | 2008028815 A1 | 3/2008 | |

OTHER PUBLICATIONS

Arnett et al., entitled "Zero-Shear Viscosity of Some Ethyl Branched Paraffinic Model Polymers," Journal of Physical Chemistry, 1980, 84(6), pp. 649-652.
Barrett et al., entitled "The Determination of Pore Volume and Area Distributions in Porous Substances. I. Computations from Nitrogen Isotherms," J. Am. Chem. Soc., 1951, 73, pp. 373.
Bird et al., entitled "Dynamics of Polymeric Liquids," vol. 1, Fluid Mechanics, 2nd Edition, John Wiley & Sons, 1987, 3 pages.

(Continued)

*Primary Examiner* — Alexandra M Moore
*Assistant Examiner* — Michael Forrest
(74) *Attorney, Agent, or Firm* — Merchant & Gould P.C.

(57) ABSTRACT

Methods for synthesizing a water-soluble titanium-silicon complex are disclosed herein. The titanium-silicon complex can be utilized to produce titanated solid oxide supports and titanated chromium supported catalysts. The titanated chromium supported catalysts subsequently can be used to polymerize olefins to produce, for example, ethylene based homopolymer and copolymers.

20 Claims, No Drawings

(56) References Cited

U.S. PATENT DOCUMENTS

| | | | |
|---|---|---|---|
| 5,739,220 A | 4/1998 | Shamshoum et al. | |
| 5,807,938 A | 9/1998 | Kaneko et al. | |
| 5,919,983 A | 7/1999 | Rosen et al. | |
| 6,239,235 B1 | 5/2001 | Hottovy et al. | |
| 6,262,191 B1 | 7/2001 | Hottovy et al. | |
| 6,489,428 B1 | 12/2002 | Debras et al. | |
| 6,833,415 B2 | 12/2004 | Kendrick et al. | |
| 7,128,884 B2 | 10/2006 | Kirkland et al. | |
| 7,271,122 B2* | 9/2007 | Bodart | C08F 10/02 502/103 |
| 7,294,599 B2 | 11/2007 | Jensen et al. | |
| 7,531,606 B2 | 5/2009 | Hendrickson | |
| 7,598,327 B2 | 10/2009 | Shaw | |
| 7,601,665 B2 | 10/2009 | McDaniel et al. | |
| 7,700,516 B2 | 4/2010 | McDaniel et al. | |
| 7,884,163 B2 | 2/2011 | McDaniel et al. | |
| 7,906,603 B2 | 3/2011 | McDaniel et al. | |
| 8,114,946 B2 | 2/2012 | Yang et al. | |
| 8,222,470 B2 | 7/2012 | Coupard et al. | |
| 8,309,485 B2 | 11/2012 | Yang et al. | |
| 8,822,608 B1 | 9/2014 | Bhandarkar et al. | |
| 9,096,699 B2 | 8/2015 | McDaniel et al. | |
| 9,365,664 B2 | 6/2016 | Schmidt et al. | |
| 10,259,893 B1 | 4/2019 | McDaniel et al. | |
| 2003/0232715 A1* | 12/2003 | Katzen | C08F 10/00 502/107 |
| 2004/0059070 A1 | 3/2004 | Whitte et al. | |
| 2014/0275457 A1* | 9/2014 | McDaniel | C08F 10/00 526/194 |
| 2015/0018503 A1 | 1/2015 | McDaniel et al. | |
| 2015/0175726 A1 | 6/2015 | McDaniel et al. | |
| 2017/0015764 A1 | 1/2017 | Praetorius et al. | |
| 2017/0080406 A1 | 3/2017 | Praetorius et al. | |

OTHER PUBLICATIONS

Brunauer et al., entitled "Adsorption of Gases in Multimolecular Layers," J. Am Chem. Soc., 1938, 60, pp. 309.

Film Extrusion Manual—Process, Materials, Properties, TAPPI Press, 1992, 16 pages.

Hieber et al., entitled "Shear-Rate-Dependence Modeling of Polymer Melt Viscosity," Polymer Engineering and Science, 1992, 32(14), pp. 931-938.

Hieber et al., entitled "Some correlations involving the shear viscosity of polystyrene melts," Rheologica Acta, 1989, vol. 28, pp. 321-332.

Janzen et al., entitled "Diagnosing long-chain branching in polyethylenes," J. Mol. Struct., 485-486 (1999) 569-584.

Modern Plastics Encyclopedia, Mid-Nov. 1995 Issue, vol. 72, No. 12, 3 pages.

Yu et al., entitled "Long Chain Branches in Metallocene-Catalyzed Polyethylene Determined by a Combination of SEC/Multi-Angle Light Scattering, NMR and Rheology," published in Polymer Preprints, 2003, vol. 44(2), pp. 49-50.

Max P. McDaniel, et al.,"Reinforcement of Cr/silica Catalysts by Secondary Deposition of Silicate Oligomers," Applied Catalysts A: General, Elsevier, Amsterdam, NL, vol. 554, Feb. 3, 2018, pp. 88-94.

International Search Report and Written Opinion issued in corresponding application No. PCT/US19/17739 dated Jul. 31, 2019, 6 pages.

IUPAC Compendium Chemical Termology, 2nd Ed. 1997.

Halsey, et al., "Physical adsorption on non-uniform surfaces," Journal of Chemical Physics, vol. 16, 1948, pp. 931-937.

Paul J. DesLauries, et al., "Short Chain Branching Profiles in Polyethylene From the Phillips Cr/Silica Catalyst", Journal of Polymer Science Part A: Polymer Chemistry, vol. 45, No. 15, Aug. 1, 2007, pp. 3135-3149; XP055124768; ISSN: 0887-624X; DOI: 10.1002/pola.22174.

International Search Report and Written Opinion dated May 10, 2019 in related application No. PCT/US2018/059950, 15 pages.

J. Forsman, et al., "Elasticity of a Percolation System: Silica Smoke," Can. J. Phys. vol. 65, 1987, pp. 767-771.

Partial International Search Report dated Mar. 13, 2019 in corresponding application No. PCT/US2018/059950, 2 pages.

\* cited by examiner

AQUEOUS METHODS FOR TITANATING A CHROMIUM/SILICA CATALYST

REFERENCE TO RELATED APPLICATION

This application is a divisional application of U.S. patent application Ser. No. 15/815,761, filed on Nov. 17, 2017, now U.S. Pat. No. 10,300,460, the disclosure of which is incorporated herein by reference in its entirety.

FIELD OF THE INVENTION

The present disclosure generally relates to titanated chromium catalysts, methods for preparing the titanated chromium catalysts, methods for using the titanated chromium catalysts to polymerize olefins, the polymer resins produced using such chromium catalysts, and articles produced using these polymer resins. More particularly, the present disclosure relates to methods for making a water-soluble titanium-silicon complex, and the subsequent use of the titanium-silicon complex to produce titanated solid oxide supports and titanated chromium supported catalysts.

BACKGROUND OF THE INVENTION

Chromium/silica-titania catalysts can be used to make HDPE. The addition of titanium to chromium/silica can increase the activity of the catalyst, but more importantly, can increase the melt index potential of the catalyst, i.e., the ability of the catalyst to produce higher melt index or higher melt flow polymers. Often, titanium addition has been accomplished via an anhydrous route, using titanium alkoxides impregnated onto chromium/silica from a suitable organic solvent, such as a hydrocarbon, an alcohol, or an ether. This anhydrous route requires subjecting the silica to a prolonged drying step at elevated temperatures to remove adsorbed moisture, which could react with the titanium alkoxide and prevent it from attaching to the silica. Further, after titanium deposition, another prolonged drying step is needed to remove organics from the solvent and the alkoxide (e.g., resulting in VOC emissions). Melt index potential also can be lost during this drying step. For at least these reasons, the anhydrous process is performed batchwise, which can further increase cost and reduce efficiency.

In view of these drawbacks, it would be beneficial to provide improved methods for making titanated chromium catalysts. It is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect of this invention, a process for producing a water-soluble titanium complex is disclosed, and in this aspect, the process can comprise (1) contacting a silicon compound with water and an acid or a base in a solvent to form a first solution containing a partially-hydrolyzed silicon material, and (2) contacting a titanium compound with the first solution containing the partially-hydrolyzed silicon material to form a second solution containing a titanium-silicon complex.

In another aspect of this invention, a process for producing a titanated solid support is disclosed, and in this aspect, the process can comprise (1) contacting a silicon compound with water and an acid or a base in a solvent to form a first solution containing a partially-hydrolyzed silicon material, (2) contacting a titanium compound with the first solution containing the partially-hydrolyzed silicon material to form a second solution containing a titanium-silicon complex, and (3) combining at least a portion of the second solution containing the titanium-silicon complex, a solid support, and optional additional water, and drying to form the titanated solid support. Further, a chromium-containing compound can be added during any of steps (1)-(3), thus resulting in a titanated chromium supported catalyst.

In yet another aspect of this invention, a process for producing a titanated chromium supported catalyst is disclosed, and in this aspect, the process can comprise (1) contacting a silicon compound with water and an acid or a base in a solvent to form a first solution containing a partially-hydrolyzed silicon material, (2) contacting a titanium compound with the first solution containing the partially-hydrolyzed silicon material to form a second solution containing a titanium-silicon complex, and (3) combining at least a portion of the second solution containing the titanium-silicon complex, a supported chromium catalyst, and optional additional water, and drying to form the titanated chromium supported catalyst.

Titanated chromium supported catalysts also are disclosed and described herein. For example, the titanated chromium supported catalyst can comprise a solid support and from about 0.1 to about 15 wt. % chromium, from about 1 to about 10 wt. % titanium, and less than or equal to about 3 wt. % carbon. These weight percentages are based on the total weight of the catalyst. Generally, at least about 75 wt. % of the chromium is present in an oxidation state of three or less.

The present invention also contemplates and encompasses olefin polymerization processes. Such processes can comprise contacting an activated titanated chromium supported catalyst and an optional co-catalyst with an olefin monomer and optionally an olefin comonomer in a polymerization reactor system under polymerization conditions to produce an olefin polymer. Beneficially, the titanated chromium supported catalysts have higher melt index potential, allowing the production of olefin polymers having higher melt indices (lower molecular weights); thus, the titanated chromium supported catalysts disclosed herein can be capable of producing, or configured to produce, higher melt index polymers.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the compounds, compositions, processes, or methods described herein are contemplated with or without explicit description of the particular combination. Additionally, unless explicitly recited otherwise, any aspect or feature disclosed herein can be combined to describe inventive compounds, compositions, processes, or methods consistent with the present disclosure.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe compositions, processes, and methods in which the materials or components are contacted or combined together in any order, in any manner, and for any length of time, unless otherwise specified. For example, the materials or components can be blended, mixed, slurried, dissolved, reacted, treated, compounded, or otherwise contacted or combined in some other manner or by any suitable method or technique.

In this disclosure, while compositions, processes, and methods are described in terms of "comprising" various components or steps, the compositions, processes, and methods also can "consist essentially of" or "consist of" the various components or steps, unless stated otherwise.

The terms "a," "an," and "the" are intended to include plural alternatives, e.g., at least one. For instance, the disclosure of "a solid support," "a chromium-containing compound," etc., is meant to encompass one, or mixtures or combinations of more than one, solid support, chromium-containing compound, etc., unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers or oligomers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or the titanated chromium supported catalyst after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

A "water-soluble" material is meant to indicate that the material is dissolved in water at standard temperature (25° C.) and pressure (1 atm); in this regard, there is no visual precipitation of the material in water. Likewise, a "solution" is meant to indicate that there is no visual precipitate at standard temperature and pressure.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the molar ratio of titanium to silicon (Ti:Si) consistent with aspects of step (2) of this invention can be in a range from about 0.1:1 to about 5:1. By a disclosure that the molar ratio of Ti:Si can be in a range from about 0.1:1 to about 5:1, the intent is to recite that the ratio can be any ratio in the range and, for example, can be equal to about 0.1:1, about 0.2:1, about 0.3:1, about 0.4:1, about 0.5:1, about 0.6:1, about 0.7:1, about 0.8:1, about 0.9:1, about 1:1, about 2:1, about 3:1, about 4:1, or about 5:1. Additionally, the molar ratio can be within any range from about 0.1:1 to about 5:1 (e.g., from about 0.3:1 to about 1:1), and this also includes any combination of ranges between about 0.1:1 and about 5:1 (e.g., the ratio can be in a range from about 0.2:1 to about 0.7:1, or from about 2:1 to about 4:1). Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, and often within 5% of the reported numerical value.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Disclosed herein are processes for preparing water-soluble titanium-silicon complexes and the use of such titanium-silicon complexes to prepare titanated solid oxide supports and titanated chromium supported catalysts. Advantageously, the steps used to prepare these materials can be conducted in water-based systems, thus eliminating prolonged drying steps. For instance, the titanated solid oxide supports and titanated chromium supported catalysts can be simply dried via spray drying or other suitable technique. Moreover, the processes can be performed in a continuous manner, and are not limited to batchwise production.

While not wishing to be bound by the following theory, it is believed that there are few known water-soluble titanium compounds, such as $TiOSO_4$, and these cannot be used in conventional methods to titanate chromium supported catalysts, such as chromium/silica. The titanium can be deposited, but not in a way that increases the melt index potential of the catalyst. It is believed that separate $TiO_2$ domains form rather than an intimate dispersion or impregnation on the silica to generate acidic sites (to which the chromium can then attach). The typical titanium alkoxides, acetylacetonates, or halides all hydrolyze upon contact with water, which can render them unusable for traditional titanation in a water-based system.

In contrast, the titanium complexes disclosed and described herein can be soluble in water, but are still effective as titanation agents. Generally, this can be accomplished by combining titanium and silicon in a solution (i.e., with no visible precipitation), so that when it is desired to deposit titanium onto a solid support or a catalyst, the titanium is already attached to silicon.

Processes for Forming Water-Soluble Titanium Complexes

Aspects of this invention are directed to a process for forming a water-soluble titanium complex. One such process can comprise (or consist essentially of, or consist of) (1) contacting a silicon compound with water and an acid or a base in a solvent to form a first solution containing a partially-hydrolyzed silicon material, and (2) contacting a titanium compound with the first solution containing the partially-hydrolyzed silicon material to form a second solution containing a titanium-silicon complex.

Generally, the features of this process (e.g., the silicon compound, the acid or base, the solvent, the titanium compound, the conditions under which the partially-hydrolyzed silicon material is formed, and the conditions under which the titanium-silicon complex is formed, among others) are independently described herein and these features can be combined in any combination to further describe the disclosed process to produce a titanium-silicon complex. Moreover, additional process steps can be performed before, during, and/or after any of the steps in any of the processes disclosed herein, and can be utilized without limitation and in any combination to further describe these processes, unless stated otherwise. Further, any water-soluble titanium-silicon complexes produced in accordance with the disclosed processes are within the scope of this disclosure and are encompassed herein.

In step (1), a silicon compound can be contacted with water and an acid or a base in a solvent to form a first solution containing a partially-hydrolyzed silicon material. In one aspect, the silicon compound, water, the acid or the base, and the solvent can be contacted or combined together in any order, while in another aspect, the silicon compound can be contacted first with the solvent, followed by addition of the acid or the base, and then water to form the first solution.

The relative amounts of water and the silicon compound are not particularly limited, so long as the molecular size of the partially-hydrolyzed silicon material, formed in step (1), does not interfere with migration into the pores of the solid support and the supported chromium catalyst in subsequent processing steps, discussed hereinbelow. Generally, if too much water is used in step (1), then $SiO_2$ may precipitate, and the titanium compound can precipitate as $TiO_2$ in step (2), which is of no practical use. On the other hand, if the amount of water used is too little in step (1), the titanium compound may not react sufficiently with the silicon material in step (2), and precipitated $TiO_2$ can result. Therefore, typical ranges for the molar ratio of water to silicon (H$_2$O:Si) in step (1) can include, but are not limited to, from about 0.05:1 to about 1.95:1, from about 0.1:1 to about 1.8:1, from about 0.2:1 to about 1.5:1, from about 0.3:1 to about 1.2:1, from about 0.05:1 to about 0.95:1, from about 0.1:1 to about 0.9:1, from about 0.2:1 to about 0.8:1, or from about 0.3:1 to about 0.7:1, and the like.

The specific silicon compound used in step (1) is not particularly limited. Representative and non-limiting examples of suitable silicon compounds can include a silicon alkoxide (e.g., tetraethyl orthosilicate), a silicon halide, a silicon hydride, a silane, a hydrocarbyl silane, a siloxane, and the like, as well as combinations thereof. Likewise, any suitable solvent can be used in step (1), but often the solvent is miscible with both oil and water. Representative and non-limiting examples of suitable solvents for use in step (1) can include a ketone (e.g., acetone), an alcohol (e.g., methanol, ethanol, n-propanol, isopropanol, n-butanol, etc.), a glycol, an ester, an ether, acetonitrile, and the like. Additionally, combinations of two or more solvents can be used.

The amount of the acid or base in step (1) is relatively small compared to that of the solvent. For instance, the weight ratio of the acid or base to the solvent (acid:solvent or base:solvent) often can be less than or equal to about 1:20; alternatively, less than or equal to about 1:50; or alternatively, less than or equal to about 1:100. Illustrative ranges for the weight ratio acid:solvent or base:solvent can include, but are not limited to, from about 1:5000 to about 1:10, from about 1:2000 to about 1:20, or from about 1:1000 to about 1:100, and the like.

When an acid is used in step (1), any suitable acid can be used, non-limiting examples of which include sulfuric acid, nitric acid, hydrochloric acid, hydrobromic acid, perchloric acid, sulfamic acid, and the like, as well as any mixture or combination thereof. Similarly, when a base is used in step (1), any suitable base can be used, non-limiting examples of which include ammonia, ammonium hydroxide, sodium hydroxide, magnesium hydroxide, an alkyl-substituted ammonium hydroxide, an organic amine, and the like, as well as any mixture or combination thereof.

Step (1) of the process, which forms a first solution containing a partially-hydrolyzed silicon material, can be conducted at any suitable temperature and for any suitable period of time. Representative and non-limiting ranges for the temperature of step (1) can include from about 5° C. to about 80° C., from about 15° C. to about 60° C., from about 10° C. to about 40° C., or from about 20° C. to about 50° C. These temperature ranges also are meant to encompass circumstances where step (1) is performed at a series of different temperatures, instead of at a single fixed temperature, falling within the respective temperature ranges.

Similarly, the time period for contacting the silicon compound, water, the acid or base, and the solvent (or for the formation of the first solution containing the partially-hydrolyzed silicon material) is not particularly limited, and can be conducted for any suitable period of time. In some aspects, the time period can be least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

Referring now to step (2), in which a titanium compound can be contacted with the first solution containing the partially-hydrolyzed silicon material to form a second solution containing a titanium-silicon complex. The relative amounts of the titanium compound and the silicon material are not particularly limited, so long as significant precipitation does not result (e.g., if the Ti:Si ratio becomes too large). However, typical ranges for the molar ratio of titanium to silicon (Ti:Si) in step (2) can include, but are not limited to, from about 0.1:1 to about 5:1, from about 0.1:1 to about 2:1, from about 0.2:1 to about 3:1, from about 0.3:1 to about 2:1, from about 0.3:1 to about 1:1, from about 0.3:1 to about 0.8:1, from about 0.3:1 to about 0.7:1, or from about 0.2:1 to about 0.9:1, and the like.

The specific titanium compound used in step (2) is not particularly limited. Consistent with certain aspects of this invention, the titanium compound can be a Ti (III) compound and/or a Ti (IV) compound. Representative and non-limiting examples of suitable titanium compounds can include a titanium alkoxide (e.g., titanium isopropoxide, titanium n-propoxide), a titanium halide, a titanium carboxylate, a titanium acetylacetonate, and the like, as well as combinations thereof.

Step (2) of the process, which forms a second solution containing a titanium-silicon complex, can be conducted at any suitable temperature and for any suitable period of time. Representative and non-limiting ranges for the temperature of step (2) can include from about 5° C. to about 80° C., from about 15° C. to about 60° C., from about 10° C. to about 40° C., or from about 20° C. to about 50° C. These temperature ranges also are meant to encompass circumstances where step (2) is performed at a series of different temperatures, instead of at a single fixed temperature, falling within the respective temperature ranges.

Similarly, the time period for contacting the titanium compound with the first solution containing the partially-hydrolyzed silicon material (or for the formation of the second solution containing a titanium-silicon complex) is not particularly limited, and can be conducted for any suitable period of time. In some aspects, the time period can be least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

In particular aspects of this invention, the second solution containing the titanium-silicon complex does not contain a precipitate. Accordingly, the aforementioned process—step (1) and step (2)—can produce a "partially hydrolyzed" water-soluble titanium-silicon complex.

Yet, in other aspects, the process—step (1) and step (2)—can further comprise a step of combining additional water and at least a portion of the second solution containing the titanium-silicon complex to form a "fully hydrolyzed" water-soluble titanium-silicon complex. The amount of additional water that is added is not particularly limited, but generally is an amount sufficient for complete hydrolysis of the titanium-silicon complex. Representative and non-limiting ranges for the molar ratio of the amount of additional water to silicon (H$_2$O:Si) in the combining step can be at least about 1:1, at least about 1.5:1, at least about 2:1, at least about 4:1, at least about 7:1, at least about 10:1, at least about 20:1, or at least about 100:1, and the like.

Consistent with aspects of this invention, the partially-hydrolyzed silicon materials of step (1) and the titanium-silicon complexes of step (2), independently, can have (or can be configured to have) molecular sizes sufficient to allow migration into the pores of the solid support and the supported chromium catalyst in subsequent processing steps, discussed hereinbelow. While not wishing to be bound by the following theory, it is believed that the molecular sizes can be significantly less than 100 Å, and in some instances, from about 2 Å, about 5 Å, or about 7 Å, up to about 15 Å, about 20 Å, or about 25 Å, while not being limited thereto.

Processes for Forming Titanated Solid Oxide Supports

In one aspect of this invention, a first process for producing a titanated solid support is disclosed, and in this aspect, the process can comprise combining—in any order—the water-soluble titanium-silicon complex produced as described above (a partially-hydrolyzed or fully-hydrolyzed titanium-silicon complex), a solid support, and optionally, additional water, and drying to form the titanated solid support.

In another aspect of this invention, a second process for producing a titanated solid support is disclosed, and in this aspect, the process can comprise (or consist essentially of, or consist of) (1) contacting a silicon compound with water and an acid or a base in a solvent to form a first solution containing a partially-hydrolyzed silicon material, (2) contacting a titanium compound with the first solution containing the partially-hydrolyzed silicon material to form a second solution containing a titanium-silicon complex, and (3) combining—in any order—at least a portion of the second solution containing the titanium-silicon complex, a solid support, and optionally, additional water, and drying to form the titanated solid support.

Generally, the features of the first and second process to produce the titanated solid support (e.g., the titanium-silicon complex, the solid support, the additional water that is added (if any), and the conditions under which the titanated solid support is formed, among others) are independently described herein and these features can be combined in any combination to further describe the disclosed processes to produce a titanated solid support. Moreover, additional process steps can be performed before, during, and/or after any of the steps in any of the processes disclosed herein, and can be utilized without limitation and in any combination to further describe the first and second process for producing a titanated solid support, unless stated otherwise. Further, any titanated solid supports produced in accordance with the disclosed processes are within the scope of this disclosure and are encompassed herein.

In the first and second process for producing a titanated solid support, when additional water is used, the titanium-silicon complex, the solid support, and the additional water can be combined in any order or sequence. For example, the titanium-silicon complex can be combined first with the solid support, followed by the additional water. Alternatively, the titanium-silicon complex can be combined first with the additional water, followed by the solid support. The components in the combining step can be contacted or combined by any suitable means, such as by mixing or slurrying the components.

In circumstances where additional water is added, the relative amount of the additional water and the titanium-silicon compound are not particularly limited, but generally, the amount of additional water added can be an amount sufficient for complete hydrolysis of the titanium-silicon complex. Representative and non-limiting ranges for the molar ratio of the amount of additional water to silicon ($H_2O$:Si) in the combining step can be at least about 1:1, at least about 1.5:1, at least about 2:1, at least about 4:1, at least about 7:1, at least about 10:1, at least about 20:1, or at least about 100:1, and the like.

The combining step of the process, which forms a titanated solid support, can be conducted at any suitable temperature and for any suitable period of time. Representative and non-limiting ranges for the temperature of the combining step can include from about 5° C. to about 80° C., from about 15° C. to about 60° C., from about 10° C. to about 40° C., or from about 20° C. to about 50° C. These temperature ranges also are meant to encompass circumstances where the combining step is performed at a series of different temperatures, instead of at a single fixed temperature, falling within the respective temperature ranges.

Similarly, the time period for contacting additional water (if used), the water-soluble titanium-silicon complex, and the solid support (or for the formation of the titanated solid support) is not particularly limited, and can be conducted for any suitable period of time. In some aspects, the time period can be least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

In particular aspects of this invention, the combining step does not result in precipitation of the titanium-silicon complex.

Any suitable solid oxide can be used as the solid support. Generally, the solid oxide can comprise oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the solid inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Illustrative examples of solid oxide materials or compounds that can be used as solid support can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid support can encompass oxide materials such as alumina, "mixed oxide" compounds thereof such as silica-alumina, and combinations or mixtures of more than one solid oxide material. Mixed oxides such as silica-alumina can be single or multiple chemical phases with more than one metal combined with oxygen to form the solid oxide. Examples of mixed oxides that can be used as solid support include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the solid support can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. No. 7,884,163, the disclosure of which is incorporated herein by reference in its entirety.

The percentage of each oxide in a mixed oxide can vary depending upon the respective oxide materials. As an example, a silica-alumina typically has an alumina content from 5 wt. % to 95 wt. %. According to one aspect, the alumina content of the silica-alumina can be from 5 wt. % alumina 50 wt. % alumina, or from 8 wt. % to 30 wt. % alumina. In another aspect, high alumina content silica-alumina compounds can be employed, in which the alumina content of these silica-alumina materials typically ranges from 60 wt. % alumina to 90 wt. % alumina, or from 65 wt. % alumina to 80 wt. % alumina.

In one aspect, the solid support can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof alternatively, silica-alumina; alternatively, silica-coated alumina; alternatively, silica-titania; alternatively, silica-zirconia;

alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, zirconia, magnesia, boria, zinc oxide, a mixed oxide thereof, or any mixture thereof. In yet another aspect, the solid support can comprise silica, alumina, titania, or a combination thereof alternatively, silica; alternatively, alumina; alternatively, titania; alternatively, zirconia; alternatively, magnesia; alternatively, boria; or alternatively, zinc oxide. In still another aspect, the solid support can comprise silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, silica-boria, aluminophosphate-silica, titania-zirconia, and the like, or any combination thereof.

Additionally, the solid support can comprise a zeolite. Any suitable zeolite can be used, for instance, large pore and medium pore zeolites. Large pore zeolites often have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often have average pore diameters in a range of from about 5 Å to about 7 Å. The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms can be equal to 2. The framework exhibits a negative electrovalence that typically can be balanced by the inclusion of cations within the crystal, such as metals, alkali metals, alkaline earth metals, and/or hydrogen.

In some aspects, the solid support can comprise an L-type zeolite. L-type zeolite supports are a sub-group of zeolitic supports, which can contain mole ratios of oxides in accordance with the formula: $M_{2/n}OAl_2O_3xSiO_2yH_2O$. In this formula, "M" designates an exchangeable cation (one or more) such as barium, calcium, cerium, lithium, magnesium, potassium, sodium, strontium, cesium, and/or zinc, as well as non-metallic cations like hydronium and ammonium ions, which can be replaced by other exchangeable cations without causing a substantial alteration of the basic crystal structure of the L-type zeolite. The "n" in the formula represents the valence of "M"; "x" is 2 or greater; and "y" is the number of water molecules contained in the channels or interconnected voids of the zeolite.

The process disclosed herein for producing titanated solid supports, and titanated solid supports produced by the processes disclosed herein, are not limited to any particular amount of titanium. Often, the amount of titanium in the titanated solid support can range from about 0.1 to about 20 wt. %; alternatively, from about 0.5 to about 15 wt. %; alternatively, from about 1 to about 10 wt. %; or alternatively, from about 1 to about 6 wt. %. These weight percentages are based on the amount of titanium relative to the total weight of the titanated solid support.

The processes disclosed herein include a step of drying. Any method or technique for drying can be used. For instance, if no additional water is added, the solid support can be combined (or impregnated) with the water-soluble titanium-silicon complex to incipient wetness, wherein the pore filling or "incipient wetness" impregnation technique used is a method in which an amount of the solution of the water-soluble titanium-silicon complex roughly equivalent to the pore volume of the solid support is mixed with the solid support until the pores are filled. In the incipient wetness impregnation technique, the solid support can be placed into a rotating drum, and the solution of the water-soluble titanium-silicon complex can be poured, sprayed or otherwise uniformly added onto the solid support. The end point of this method can vary somewhat, so that the titanated solid support could have a free-flowing dry appearance to the first appearances of clumping. However, typically there would not be any free-flowing liquid present when the incipient wetness method is employed. As would be recognized by those of skill in the art, other suitable techniques and equipment can be employed when no additional water is added, and such techniques and equipment are encompassed herein.

In aspects where no additional water is added, the drying step can encompass a wide range of drying times, drying temperatures, and drying pressures. For example, the drying time can range from about 1 to about 48 hours, from about 2 to about 24 hours, or from about 2 to about 12 hours, and the drying temperature can range from about 15° C. to about 200° C., from about 25° C. to about 150° C., or from about 50° C. to about 125° C. The drying pressure can be at or around atmospheric pressure, but in many instances, the drying step can be conducted under vacuum conditions at any suitable sub-atmospheric pressure, such as less than 100 torr (13.3 kPa), less than 50 (6.67 kPa) torr, or less than 10 torr (1.33 kPa).

Various types of dryer devices can be used for the drying step (typically when additional water has been added), such as tray dryers, rotary dryers, fluidized bed dryers, and spray dryers, although not limited thereto. Likewise, the flow of the drying medium (gas flow) relative to the solid support is not particularly limited, and encompasses concurrent flow, countercurrent flow, and flow through (e.g., such as in a fluidized bed).

In some aspects of this invention, the drying step can comprise spray drying. Generally, spray drying can be used to transform the wet titanated solid support (e.g., a slurry or suspension of the titanated solid support in water) to a dried particulate or powder form by spraying a feed stream containing the wet titanated solid support into a device containing a hot drying gas (usually air), in which the residual water evaporates from the titanated solid support.

In the spray drying process, the feed stream can be sprayed into a drying chamber in the form of droplets, and contacted with a large volume of a hot gas, which directly contacts the wet solid support. Typical gas inlet temperatures range from 125° C. to about 800° C., or from about 150° C. to about 500° C., but are not limited thereto. The flow of the gas relative to the flow of the solid support into the spray dryer can be concurrent flow, countercurrent flow, or mixed flow. After drying, the gas stream and the dried titanated solid support are separated. If needed, fines can be removed in filter collectors or cyclones. The dried titanated solid support can have the form of free-flowing particulate solids.

The initial feed into the spray dryer can be subjected to an atomization process, which can employ, for instance, a high-pressure nozzle, a two-fluid nozzle, or a high-speed centrifugal disk. High-pressure nozzles result in atomization by forcing the solid support slurry under high pressure through a small nozzle orifice, the size of which can depend on the desired pressure and particle size of the solids in the slurry, among other factors. Wear on the nozzle orifice and plugging can result during long-term operation; therefore, regular maintenance can be beneficial to ensure proper atomization. Two-fluid nozzles have the advantage of a relatively low operating pressure, and often can be used when the feed stream is a thick or high-solids slurry, which does not work well in high-pressure nozzle systems. The atomizing fluid can be steam or air.

High-speed centrifugal disks atomize the solid support slurry by contacting the slurry with a rapidly rotating disk. Disk diameter and disk speed (e.g., 3,000 rpm and above) can be varied to produce a suitable droplet size for drying. Beneficially, disk atomization is not subject to wear and plugging, as in the nozzle systems. Disk rotation can be driven by any suitable motor or technique.

Regardless of the atomization process, the spray drying process can be configured to maintain the spherical nature of the titanated solid support. The average particle size of the solid support can be maintained in many instances, and generally, the average particle size depends upon the atomization process, the solids content of the solid support feed stream, feed stream viscosity, and feed rate, among other factors. Likewise, bulk density of the dried titanated solid support can be controlled based on operating conditions of the spray dryer, such as droplet size, inlet gas temperature, and air turbulence, among other factors.

Mixing of the gas stream (e.g., air) and the droplet in the drying chamber can be accomplished, for example, using concurrent flow of gas and solids (e.g., horizontal or vertical spray dryers), or countercurrent flow of gas and solids. In the latter case, upward air flow can carry fines to the top of the chamber for easy removal. Mixed flow spray dryers combine countercurrent and concurrent drying, with complex flow patterns and high turbulence for efficient heat and mass transfer.

A benefit to spray drying can be the short contact time of the titanated solid support to elevated temperatures in the drying chamber. Thus, in addition to average particle size, the spray drying process can be configured to produce dried titanated solid supports that have surface areas and pore volumes that are comparable to the starting material (i.e., prior to spray drying).

Optionally, after drying, the titanated solid support can be calcined, which can be conducted at a variety of temperatures and time periods. Typical peak calcining temperatures often fall within a range from about 200° C. to about 800° C., such as from about 250° C. to about 600° C., from about 300° C. to about 600° C., or from about 300° C. to about 500° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges. For instance, the calcination step can start at an initial temperature that is the same as the drying temperature in the drying step. Subsequently, the temperature of the calcination can be increased to a peak calcining temperature, for example, in a range from about 250° C. to about 600° C.

The duration of the calcining step is not limited to any particular period of time. Hence, the calcining step can be conducted, for example, in a time period ranging from as little as 30-45 minutes to as long as 36-48 hours, or more. The appropriate calcining time can depend upon, for example, the initial/peak calcining temperature, among other variables. Generally, however, the calcining step can be conducted in a time period that can be in a range from about 30 minutes to about 48 hours, such as, for example, from about 1 hour to about 24 hours, from about 1 hour to about 12 hours, from about 2 hours to about 12 hours, or from about 2 hours to about 8 hours.

The calcining step can be conducted in a calcining gas stream that comprises (or consists essentially of, or consists of) an inert gas (e.g., nitrogen), oxygen, air, or any mixture or combination thereof. In some aspects, the calcining gas stream can comprise air, while in other aspects, the calcining gas stream can comprise a mixture of air and nitrogen. Yet, in certain aspects, the calcining gas stream can be an inert gas, such as nitrogen and/or argon.

The calcining step can be conducted using any suitable technique and equipment, whether batch or continuous. For instance, the calcining step can be performed in a belt calciner or, alternatively, a rotary calciner. In some aspects, the calcining step can be performed in a batch or continuous calcination vessel comprising a fluidized bed. As would be recognized by those of skill in the art, other suitable techniques and equipment can be employed for the calcining step, and such techniques and equipment are encompassed herein.

The pore volume of the titanated solid support is not particularly limited. For instance, the titanated solid support can have a pore volume (total pore volume via mercury intrusion) in a range from about 0.5 to about 5 mL/g, from about 1 to about 5 mL/g, from about 1 to about 3 mL/g, or from about 1.2 to about 2.5 mL/g. Likewise, the surface area of the titanated solid support is not limited to any particular range. Generally, however, the titanated solid support can have a BET surface area in a range from about 200 to about 700 $m^2/g$, from about 100 to about 600 $m^2/g$, from about 250 to about 600 $m^2/g$, from about 250 to about 550 $m^2/g$, or from about 275 to about 525 $m^2/g$.

The titanated solid support can have any suitable particle size, as would be recognized by those of skill in the art. Illustrative and non-limiting ranges for the average (d50) particle size of the titanated solid support can include from about 10 to about 500 microns, from about 25 to about 250 microns, from about 40 to about 160 microns, or from about 40 to about 120 microns.

Processes for Forming Titanated Chromium Catalysts

Aspects of this invention also are directed to processes for producing titanated chromium supported catalysts. In the processes for producing titanium-silicon complexes and for producing titanated solid supports, described hereinabove, chromium can be incorporated at any step in the respective processes. In one aspect, for example, chromium can be added in step (1). In this aspect, step (1) can comprise contacting the silicon compound, water, the acid or the base, and a chromium-containing compound in the solvent. The components in step (1) can be contacted in any order or sequence. In another aspect, chromium can be added in step (2). In this aspect, step (2) can comprise contacting the titanium compound and a chromium-containing compound with the first solution containing the partially-hydrolyzed silicon material. As above, the components in step (2) can be contacted in any order or sequence. In yet another aspect, chromium can be added in step (3). In this aspect, step (3) can comprise combining (in any order) a chromium-containing compound, at least a portion of the second solution containing the titanium-silicon complex, a solid support, and optionally, additional water, and drying. If the titanated solid support has already been produced, chromium can be incorporated by combining the titanated solid support and a chromium-containing compound, in water, and drying. Titanated chromium supported catalysts produced in accordance with any of these processes are within the scope of this disclosure and are encompassed herein.

Any suitable chromium-containing compound (or chromium precursor) can be used to form the titanated chromium supported catalyst. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) napthenate, a chromium (III) halide, chromium (III) sulfate, chromium (III) nitrate, a chromium (III) dionate, and the like, as well as combinations thereof. In some aspects, the chromium-containing compound can comprise chromium (III) acetate, chromium (III) acetylacetonate, chromium (III) chloride, chromium (III) bromide, chromium (III) sulfate, chromium (III) nitrate, and the like, as well combinations thereof.

While not required, it can be beneficial for the chromium-containing compound to be soluble in the solvent, for instance, depending upon which step of the process is the chromium incorporation step. In such situations, the chromium-containing compound can comprise tertiary butyl chromate, a diarene chromium (0) compound, bis-cyclopentadienyl chromium (II), chromium (III) acetylacetonate, chromium acetate, and the like, or any combination thereof.

Similarly, and not required, it can be beneficial for the chromium-containing compound to be soluble in water, for instance, depending upon which step of the process is the chromium incorporation step. In such situations, the chromium-containing compound can comprise chromium trioxide, chromium acetate, chromium nitrate, and the like, or any combination thereof.

Consistent with other aspects of this invention, titanium can added to a supported chromium catalyst to produce a titanated chromium supported catalyst. One such process for producing a titanated chromium supported catalyst can comprise combining—in any order—the water-soluble titanium-silicon complex produced as described hereinabove (a partially-hydrolyzed or fully-hydrolyzed titanium-silicon complex), a supported chromium catalyst, and optionally, additional water, and drying to form the titanated chromium supported catalyst.

Another process for producing a titanated chromium supported catalyst can comprise (or consist essentially of, or consist of) (1) contacting a silicon compound with water and an acid or a base in a solvent to form a first solution containing a partially-hydrolyzed silicon material, (2) contacting a titanium compound with the first solution containing the partially-hydrolyzed silicon material to form a second solution containing a titanium-silicon complex, and (3) combining—in any order—at least a portion of the second solution containing the titanium-silicon complex, a supported chromium catalyst, and optionally, additional water, and drying to form the titanated chromium supported catalyst.

Generally, the features of these processes to produce the titanated chromium supported catalyst (e.g., the titanium-silicon complex, the supported chromium catalyst, the additional water that is added (if any), and the conditions under which the titanated chromium supported catalyst is formed, among others) are independently described herein and these features can be combined in any combination to further describe the disclosed processes to produce a titanated chromium supported catalyst. Moreover, additional process steps can be performed before, during, and/or after any of the steps in any of the processes disclosed herein, and can be utilized without limitation and in any combination to further describe the processes for producing a titanated chromium supported catalyst, unless stated otherwise. Further, any titanated chromium supported catalysts produced in accordance with the disclosed processes are within the scope of this disclosure and are encompassed herein.

In these processes for producing a titanated chromium supported catalyst, when additional water is used, the titanium-silicon complex, the supported chromium catalyst, and the additional water can be combined in any order or sequence. For example, the titanium-silicon complex can be combined first with the supported chromium catalyst, followed by the additional water. Alternatively, the titanium-silicon complex can be combined first with the additional water, followed by the supported chromium catalyst. The components in the combining step can be contacted or combined by any suitable means, such as by mixing or slurrying the components.

In circumstances where additional water is added, the relative amount of the additional water and the titanium-silicon compound are not particularly limited, but generally, the amount of additional water added can be an amount sufficient for complete hydrolysis of the titanium-silicon complex. Representative and non-limiting ranges for the molar ratio of the amount of additional water to silicon ($H_2O$:Si) in the combining step can be at least about 1:1, at least about 1.5:1, at least about 2:1, at least about 4:1, at least about 7:1, at least about 10:1, at least about 20:1, or at least about 100:1, and the like.

The combining step of the process, which forms a titanated chromium supported catalyst, can be conducted at any suitable temperature and for any suitable period of time. Representative and non-limiting ranges for the temperature of the combining step can include from about 5° C. to about 80° C., from about 15° C. to about 60° C., from about 10° C. to about 40° C., or from about 20° C. to about 50° C. These temperature ranges also are meant to encompass circumstances where the combining step is performed at a series of different temperatures, instead of at a single fixed temperature, falling within the respective temperature ranges.

Similarly, the time period for contacting additional water (if used), the water-soluble titanium-silicon complex, and the supported chromium catalyst (or for the formation of the titanated chromium supported catalyst) is not particularly limited, and can be conducted for any suitable period of time. In some aspects, the time period can be least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

In particular aspects of this invention, the combining step does not result in precipitation of the titanium-silicon complex.

Any suitable supported chromium catalyst can be used. Numerous commercially-available grades of chromium catalyst, supported on various solid oxide supports, can be impregnated with titanium as disclosed herein. Often, the supported chromium catalyst can comprise chromium/silica, chromium/silica-titania, chromium/silica-titania-magnesia, chromium/silica-alumina, chromium/silica-coated alumina, chromium/aluminophosphate, and the like, or any combination thereof. In one aspect, the supported chromium catalyst can comprise chromium/silica, while in another aspect, the supported chromium catalyst can comprise chromium/silica-titania. In yet another aspect, the supported chromium catalyst can comprise chromium/silica-titania-magnesia; alternatively, chromium/silica-alumina; alternatively, chromium/silica-coated alumina; or alternatively, chromium/aluminophosphate.

The processes disclosed herein include a step of drying to form the titanated chromium supported catalyst. Any method or technique for drying can be used, such as the drying techniques disclosed hereinabove (e.g., spray drying) in relation to the titanated solid support.

In various aspects encompassed herein, the titanated chromium supported catalyst can be subjected to a thermal treatment step (often referred to as a calcining or activation step). The thermal treatment (or calcination or activation) process can be conducted at a variety of temperatures and time periods, which are generally selected to convert all or a portion of the chromium to hexavalent chromium. Often, the thermal treatment is performed in an oxidizing atmosphere, but this is not a requirement. Activated titanated chromium supported catalysts produced by such thermal treatment processes also are encompassed by this invention.

In others aspects, the processes to form titanated solid supports, as described above, can further comprises a step of contacting the titanated solid support with a chromium-containing compound—representative and non-limiting examples of the chromium-compound include chromium (III) acetate, basic chromium (III) acetate, chromium (III) acetylacetonate, $Cr_2(SO_4)_3$, $Cr(NO_3)_3$, and $CrO_3$—while thermally treating to form an activated titanated chromium supported catalyst. In these aspects, chromium can be impregnated during the thermal treatment (or calcination or activation) process, which can be conducted at a variety of temperatures and time periods, and are generally selected to convert all or a portion of the chromium to hexavalent chromium. Similarly, activated titanated chromium supported catalysts produced by these thermal treatment processes (with concurrent chromium addition) also are encompassed by this invention.

As noted above, thermal treatment (or calcining or activation) can be conducted at a variety of temperatures and time periods, which are generally selected to convert all or a portion of the chromium to hexavalent chromium. For instance, the thermal treatment step can be conducted at a peak temperature in a range from about 400° C. to about 1000° C.; alternatively, from about 500° C. to about 900° C.; from about 500° C. to about 900° C.; alternatively, from about 600° C. to about 871° C.; alternatively, from about 550° C. to about 850° C.; alternatively, from about 700° C. to about 850° C.; alternatively, from about 725° C. to about 900° C.; alternatively, from about 725° C. to about 871° C.; alternatively, from about 725° C. to about 850° C.; alternatively, from about 750° C. to about 871° C.; or alternatively, from about 750° C. to about 850° C. In these and other aspects, these temperature ranges also are meant to encompass circumstances where the activation step is conducted at a series of different temperatures (e.g., an initial temperature, a peak temperature), instead of at a single fixed temperature, falling within the respective ranges. For instance, the activation step can start at an initial temperature, and subsequently, the temperature of the activation step can be increased to the peak temperature, for example, a peak temperature in a range from about 550° C. to about 850° C., or from about 725° C. to about 900° C.

The duration of the thermal treatment step is not limited to any particular period of time. Hence, this thermal treatment step can be conducted, for example, in a time period ranging from as little as 1 minute to as long as 12-24 hours, or more. The appropriate activation time can depend upon, for example, the initial/peak temperature, among other variables. Generally, however, the activation step can be conducted in a time period that can be in a range from about 1 minute to about 24 hours, such as, for example, from about 30 minutes to about 8 hours, from about 1 hour to about 12 hours, from about 2 hours to about 12 hours, from about 3 hours to about 10 hours, or from about 5 hours to about 10 hours.

In particular aspects of this invention, there can be substantially no VOC's (volatile organic compounds) emitted during the thermal treatment (calcination/activation) step. For instance, there can be substantially no VOC's emitted during the thermal treatment step when the titanium-silicon complex is completely hydrolyzed. Thus, in accordance with certain aspects of this invention, the titanated chromium supported catalyst (or activated titanated chromium supported catalyst) can contain less than or equal to about 3 wt. % carbon, less than or equal to about 2.5 wt. % carbon, or less than or equal to about 2 wt. % carbon, and in further aspects, less than or equal to about 1 wt. % carbon, less than or equal to about 0.5 wt. % carbon, or less than or equal to about 0.25 wt. % carbon. These weight percentages are based on the amount of carbon relative to the total weight of the respective catalyst.

The amount of titanium in the titanated chromium supported catalysts (or activated titanated chromium supported catalysts) disclosed herein is not particularly limited. Generally, however, the amount of titanium in the titanated chromium supported catalyst (whether activated or not) can range from about 0.1 to about 20 wt. %; alternatively, from about 0.5 to about 15 wt. %; alternatively, from about 1 to about 10 wt. %; alternatively, from about 1 to about 6 wt. %; or alternatively, from about 1.5 to about 5 wt. % titanium. These weight percentages are based on the amount of titanium relative to the total weight of the respective catalyst.

Likewise, the amount of chromium in the titanated chromium supported catalysts (or activated titanated chromium supported catalysts) disclosed herein is not particularly limited. Generally, however, the amount of chromium in the titanated chromium supported catalyst (whether activated or not) can range from about 0.1 to about 20 wt. %; alternatively, from about 0.1 to about 15 wt. %; alternatively, from about 0.5 to about 15 wt. %; alternatively, from about 0.5 to about 5 wt. %; alternatively, from about 0.5 to about 2.5 wt. %; alternatively, from about 1 to about 10 wt. %; or alternatively, from about 1 to about 6 wt. %. These weight percentages are based on the amount of chromium relative to the total weight of the respective catalyst.

The pore volume of the titanated chromium supported catalyst (or activated titanated chromium supported catalyst) is not particularly limited. For instance, the titanated chromium supported catalyst (or activated titanated chromium supported catalyst) can have a pore volume (total pore volume via mercury intrusion) in a range from about 0.5 to about 5 mL/g, from about 1 to about 5 mL/g, from about 1 to about 4 mL/g, from about 1 to about 3 mL/g, or from about 1.2 to about 2.5 mL/g. Likewise, the surface area of the titanated chromium supported catalyst (or activated titanated chromium supported catalyst) is not limited to any particular range. Generally, however, the titanated chromium supported catalyst (or activated titanated chromium supported catalyst) can have a BET surface area in a range from about 200 to about 700 m$^2$/g, from about 100 to about 600 m$^2$/g, from about 250 to about 600 m$^2$/g, 200 to about 550 m$^2$/g, from about 250 to about 550 m$^2$/g, or from about 275 to about 525 m$^2$/g.

The titanated chromium supported catalyst (or activated titanated chromium supported catalyst) can have any suitable particle size, as would be recognized by those of skill in the art. Illustrative and non-limiting ranges for the average (d50) particle size of the titanated chromium supported catalyst (or activated titanated chromium supported catalyst) can include from about 10 to about 500 microns, from about 25 to about 250 microns, from about 40 to about 160 microns, or from about 40 to about 120 microns.

A representative and non-limiting example of a titanated chromium supported catalyst consistent with this invention can comprise a solid support and from about 0.1 to about 15 wt. % chromium, from about 1 to about 10 wt. % titanium, and less than or equal to about 3 wt. % carbon (or any respective amount of chromium, titanium, and carbon disclosed herein). These weight percentages are based on the total weight of the catalyst. Further, at least about 75 wt. % of the chromium is present in an oxidation state of three or less. While not wishing to be bound by the following theory, it is believed that a titanated chromium supported catalyst having these characteristics, when subjected to a thermal treatment step (calcination/activation), will no longer have the chromium in a lower oxidation state. Typically, all or a large portion of the chromium will be converted to hexavalent chromium.

Another representative and non-limiting example of a titanated chromium supported catalyst can comprise a solid support and from about 0.1 to about 5 wt. % chromium (or from about 0.5 to about 2.5 wt. % chromium), from about 1 to about 6 wt. % titanium (or from about 1.5 to about 5 wt. % titanium), and less than or equal to about 2 wt. % carbon (or less than or equal to about 1 wt. % carbon, or less than or equal to about 0.5 wt. % carbon). Further, at least about 80 wt. % (or at least about 90 wt. %, or at least about 95 wt. %, or substantially all) of the chromium can be present in an oxidation state of three or less.

Thus, consistent with aspects of this invention, the amount of the solid support in the titanated chromium supported catalyst generally can range from about 72 to about 98.5 wt. %; alternatively, from about 87 to about 98 wt. %; alternatively, from about 92 to about 98 wt. %; alternatively, from about 93 to about 98 wt. %; or alternatively, from about 94 to about 97 wt. % solid support. These weight percentages are based on the weight of the solid support relative to the total weight of the catalyst.

The titanated chromium supported catalyst can have any pore volume, surface area, and average particle size disclosed herein, such as a total pore volume from about 0.5 to about 5 mL/g (or from about 1 to about 4 mL/g), a BET surface area from about 200 to about 700 m$^2$/g (or from about 200 to about 550 m$^2$/g), and a d50 average particle size from about 10 to about 500 microns. Likewise, any suitable solid support can be employed, non-limiting examples of which include silica, silica-alumina, silica-coated alumina, silica-titania, silica-titania-magnesia, silica-zirconia, silica-magnesia, silica-boria, aluminophosphate-silica, and the like, as well as any combination thereof. An illustrative titanated chromium supported catalyst in which the solid support is silica can be referred to as a titanated chromium/silica catalyst. The titanated chromium/silica catalyst, therefore, can comprise silica and from about 0.1 to about 15 wt. % chromium, from about 1 to about 10 wt. % titanium, and less than or equal to about 3 wt. % carbon, based on the total weight of the catalyst (or any respective amount of chromium, titanium, and carbon disclosed herein). At least about 75 wt. % of the chromium is present in an oxidation state of three or less, prior to activation/calcination.

Polymerization Processes

Titanated chromium supported catalysts of the present invention can be used to polymerize olefins to form homopolymers, copolymers, terpolymers, and the like. One such process for polymerizing olefins can comprise contacting any (activated) titanated chromium supported catalyst disclosed herein (e.g., produced by any process disclosed herein) and an optional co-catalyst with an olefin monomer and an optional olefin comonomer in a polymerization reactor system under polymerization conditions to produce an olefin polymer.

The catalyst compositions and/or polymerization processes disclosed herein often can employ a co-catalyst. In some aspects, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentyl aluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used in the catalyst compositions of this invention are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Unsaturated monomers that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent, based on the total weight of the monomer and comonomer. According to another aspect of the present invention, the amount of comonomer introduced into a polymerization reactor system can be from about 0.01 to about 40 weight percent comonomer, based on the total weight of the monomer and comonomer, or alternatively, from about 0.1 to about 35 weight percent comonomer, or from about 0.5 to about 20 weight percent comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

The titanated chromium supported catalysts of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). For instance, the polymerization reactor system can comprise a solution reactor, a gas-phase reactor, a slurry reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately in such high pressure polymerization reactors to obtain optimal polymerization reaction conditions.

According to yet another aspect, the polymerization reactor system can comprise a solution polymerization reactor, wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures (e.g., up to between 150° C. and 180° C.) and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some aspects, the polymerization reactor system can comprise any combination of a raw material feed system, a feed system for catalyst and/or catalyst components, and/or a polymer recovery system, including continuous systems. In other aspects, suitable reactor systems can comprise systems for feedstock purification, catalyst storage and preparation, extrusion, reactor cooling, polymer recovery, fractionation, recycle, storage, loadout, laboratory analysis, and process control.

Polymerization conditions that can be monitored, adjusted, and/or controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, from about 60° C. to about 185° C., from about 60° C. to about 115° C., or from about 130° C. to about 180° C., depending upon the type of polymerization reactor, the polymer grade, and so forth. In some reactor systems, the polymerization reactor temperature generally can be within a range from about 70° C. to about 110° C., or from about 125° C. to about 175° C. Various polymerization conditions can be held substantially constant, for example, for the production of a particular grade of olefin polymer.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 psig to 500 psig range (1.4 MPa to 3.4 MPa). High pressure polymerization in tubular or autoclave reactors generally can be conducted at about 20,000 psig to 75,000 psig (138 MPa to 517 MPa). Polymerization reactors can also be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

Aspects of this invention also are directed to olefin polymerization processes conducted in the absence of added hydrogen. An olefin polymerization process of this invention can comprise contacting a titanated chromium supported catalyst and an optional co-catalyst with an olefin monomer and optionally an olefin comonomer in a polymerization reactor system under polymerization conditions to produce an olefin polymer, and wherein the polymerization process is conducted in the absence of added hydrogen (no hydrogen is added to the polymerization reactor system). As one of ordinary skill in the art would recognize, hydrogen can be generated in-situ by certain catalyst systems in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a titanated chromium supported catalyst and an optional co-catalyst with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from about 0.05 to about 20 mole %, from about 0.1 to about 15 mole %, from about 0.25 to about 10 mole %, or from about 0.5 to about 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within about +/−25% during the polymerization run. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Ethylene polymers produced in accordance with this invention can have a high load melt index (HLMI) of less than or equal to about 200, less than or equal to about 150, or less than or equal to about 100 g/10 min. Suitable ranges for the HLMI can include, but are not limited to, from 0 to about 150, from about 1 to about 100, from about 1 to about 80, from about 2 to about 80, from about 4 to about 60, from about 8 to about 60, from about 1 to about 50, from about 3 to about 50, from about 3 to about 40, or from about 6 to about 40 g/10 min.

The densities of ethylene-based polymers produced using the titanated chromium supported catalysts and the processes disclosed herein often are greater than or equal to about 0.89 g/cm$^3$. In one aspect of this invention, the density of the ethylene polymer can be in a range from about 0.90 to about 0.97 g/cm$^3$. Yet, in another aspect, the density can be in a range from about 0.91 to about 0.96 g/cm$^3$, such as, for example, from about 0.92 to about 0.96 g/cm$^3$, from about 0.93 to about 0.955 g/cm$^3$, or from about 0.94 to about 0.955 g/cm$^3$.

In an aspect, ethylene polymers described herein can have a ratio of Mw/Mn, or the polydispersity index, of greater than or equal to about 5, greater than or equal to about 6, or greater than or equal to about 7. Often, the Mw/Mn can range up to about 30-40, therefore, non-limiting ranges for Mw/Mn include from about 5 to about 40, from about 5 to about 30, from about 5 to about 20, from about 6 to about 35, from about 6 to about 30, from about 6 to about 20, from about 10 to about 30, from about 10 to about 25, from about 15 to about 40, or from about 15 to about 25.

In an aspect, ethylene polymers described herein can have a ratio of $I_{21}/I_{10}$ in a range from about 2 to about 10, from about 2 to about 9, from about 3 to about 10, from about 3 to about 9, or from about 3 to about 8. In another aspect, ethylene polymers described herein can have a ratio of $I_{21}/I_{10}$ in a range from about 4 to about 10, from about 4 to about 9, from about 5 to about 10, or from about 5 to about 7.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process*, Materials, Properties, TAPPI Press, 1992; the disclosures of which are incorporated herein by reference in their entirety.

Also contemplated herein is a method for forming or preparing an article of manufacture comprising a polymer produced by any of the polymerization processes disclosed herein. For instance, a method can comprise (i) contacting a titanated chromium supported catalyst (e.g., produced as described herein) and an optional co-catalyst with an olefin monomer and an optional olefin comonomer under polymerization conditions in a polymerization reactor system to produce an olefin polymer; and (ii) forming an article of manufacture comprising the olefin polymer (e.g., having any of the polymer properties disclosed herein). The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Melt index (MI, g/10 min) was determined in accordance with ASTM D1238 at 190° C. with a 2.16 kg weight, $I_{10}$ (g/10 min) was determined in accordance with ASTM D1238 at 190° C. with a 10 kg weight, and high load melt index (HLMI, $I_{21}$, g/10 min) was determined in accordance with ASTM D1238 at 190° C. with a 21.6 kg weight.

Catalyst Examples A-D

Chromium Supported Catalysts and Titanated Chromium Supported Catalysts

Catalyst A was a commercial Cr/silica, having a surface area of 500 m$^2$/g and a pore volume of 1.6 mL/g. While not tested, it is expected that at least 99 wt. % of the chromium was present in an oxidation state of three or less. The catalyst was subsequently activated (calcined) in dry air for three hours at 650° C. Catalyst A was a control catalyst containing 1 wt. % chromium, but no titanium.

Catalyst B was prepared by impregnating Catalyst A with 8 wt. % Ti as an acidic solution of TiOSO$_4$. Then, the acidic mixture was slowly neutralized (over 4 hours) by dripping NH$_4$OH solution into the mixture. Next, the titanated catalyst was dried and subsequently activated at 650° C. for three hours in dry air. Catalyst B was a control catalyst using a representative water-soluble titanium compound.

Catalyst C was prepared by impregnating Catalyst A with 2.5 wt. % Ti as a water-soluble titanium-silicon complex, followed by drying and subsequent activation at 650° C. To make this titanium-silicon complex, 52 g (0.25 mol) of tetraethyl orthosilicate were added to 140 g of n-propanol, followed by 0.5 mL of a concentrated HCl solution. Then, 2.5 mL (0.14 mol) of water were added and the mixture was warmed to 40° C. and stirred for 15 minutes. Then 35.5 g (0.125 mol) of titanium tetraisopropoxide were added to the solution, followed by warming to 40° C. and stirring for another 20 minutes. There was no precipitate. A clear solution was formed, which could then be added to water without precipitation or gelation. Next, 30 mL of this clear solution were added to 20 g of the Cr/silica catalyst (Catalyst A), resulting in a damp sand-like consistency, followed by the addition of 100 mL of water. This last water-addition step hydrolyzed the last residual alkoxy groups to leave a clean catalyst. While not tested, it is expected that the catalyst contained significantly less than 1.5 wt. % carbon, and at least 99 wt. % of the chromium was present in an oxidation state of three or less. The titanated catalyst was dried and subsequently activated at 650° C. for three hours in dry air.

Catalyst D was prepared by impregnating Catalyst A with 2.5 wt. % Ti as a water-soluble titanium-silicon complex, followed by drying and subsequent activation at 650° C. To make this titanium-silicon complex, 104 g (0.5 mol) of tetraethyl orthosilicate were added to 200 g of n-propanol, followed by 1 mL of concentrated HNO$_3$ solution. Then, 5 mL (0.28 mol) of water were added and the mixture was warmed to 40° C. and stirred for 15 minutes. Then, 71 g (0.25 mol) of titanium tetraisopropoxide were added to the solution, followed by warming to 40° C. and stirring for another 20 min. There was no precipitate. A clear solution was formed, which could then be added to water without precipitation or gelation. Next, 16 mL of this clear solution were added to 10 g of the Cr/silica catalyst (Catalyst A), resulting a damp sand-like consistency, followed by the addition of 100 mL of water. This last water-addition step hydrolyzed the last residual alkoxy groups to leave a clean catalyst. While not tested, it is expected that the catalyst contained significantly less than 1.5 wt. % carbon, and at least 99 wt. % of the chromium was present in an oxidation state of three or less. The titanated catalyst was dried and subsequently activated at 650° C. for three hours in dry air.

Polymerization Experiments with Catalysts A-D

Effect of Titanation on Polymer Melt Index

The chromium catalysts, prepared as described above, were used in polymerization experiments conducted in a 2-L stainless steel reactor. Isobutane (1.2 L) was used in all runs. Approximately 50-100 mg of the activated chromium catalyst was added through a charge port while slowly venting isobutane vapor. The charge port was closed and the isobutane was added. The contents of the reactor were stirred and heated to the desired run temperature of 105° C., and ethylene was then introduced into the reactor (no comonomer, hydrogen, or co-catalyst was used). Ethylene was fed on demand to maintain a reactor pressure of about 550 psig, and each polymerization run was conducted for 50-135 minutes. Catalyst C and Catalyst D were evaluated at two different reaction times and catalyst productivity's.

Table I summarizes the supported chromium catalyst used, melt flow properties of the ethylene polymer produced (HLMI ($I_{21}$), ($I_{21}$), and MI ($I_2$) are in units of g/10 min), and catalyst activities (g/g/hr) and productivities (g/g) relating to the polymerization experiments. Unexpectedly, catalysts C and D (titanated chromium supported catalysts produced in accordance with this invention) produced polymers having significantly higher melt indices than that of catalyst A (no titanium), demonstrating the successful titanation procedure. Catalyst B was formed with a common water-soluble titanium compound (TiOSO$_4$), but without successful titanation, as shown by the polymers produced using Catalyst A and Catalyst B having the same melt indices.

TABLE I

Polymerization Summary.

| Catalyst | Productivity | Activity | HLMI | $I_{10}$ | MI | HLMI/$I_{10}$ |
| --- | --- | --- | --- | --- | --- | --- |
| A | 2,970 | 2,970 | 5.5 | 0.87 | 0 | 6.3 |
| B | 2,020 | 1,570 | 4.9 | 0.81 | 0 | 6.0 |
| C | 1,100 | 1,290 | 14.6 | 2.66 | 0.08 | 5.5 |
| C | 1,930 | 860 | 15.0 | 2.88 | 0.10 | 5.2 |
| D | 3,280 | 3,520 | 9.8 | 1.60 | 0.03 | 6.1 |
| D | 2,660 | 2,580 | 16.7 | 2.70 | 0.04 | 6.2 |

Constructive Example

Titanating a Solid Support and Adding Chromium to Produce a Titanated Supported Catalyst A titanated chromium supported catalyst can be prepared by impregnating a solid support, such as silica (having a surface area of approximately 400 m$^2$/g and a pore volume of approximately 1.6 mL/g) with 2.5 wt. % Ti as a water-soluble titanium-silicon complex, and with chromium, followed by drying. The titanium-silicon complex can be prepared as described above for the preparation of Catalyst C. Approximately 30 mL of the solution containing the titanium-silicon complex can be mixed with 20 g of the silica solid support and a solution of chromium (III) acetate, followed by the addition of 100 mL of water (alternatively, the chromium (III) acetate can be added with the addition of the 100 mL of water). After drying, the titanated chromium/silica catalyst can contain 2.5 wt. % Ti and 1 wt. % Cr. It is expected that the catalyst contains significantly less than 2 wt. % carbon, and at least 95 wt. % of the chromium is present in an oxidation state of three or less.

It is expected that the activated chromium/silica catalyst will produce higher melt index polymers, similar to those produced with Catalyst C and Catalyst D, when tested under the same polymerization conditions.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process for preparing a titanium-silicon complex, the process comprising:

(1) contacting a silicon compound with water and an acid or a base in a solvent to form a first solution containing a partially-hydrolyzed silicon material; and (2) contacting a titanium compound with the first solution containing the partially-hydrolyzed silicon material to form a second solution containing a titanium-silicon complex.

Aspect 2. The process defined in aspect 1, wherein the silicon compound, water, the acid or the base, and the solvent are combined in any order.

Aspect 3. The process defined in aspect 1, wherein the silicon compound is contacted with the solvent, followed by addition of the acid or the base, and then water to form the first solution.

Aspect 4. The process defined in any one of the preceding aspects, wherein a molar ratio of water to silicon (H$_2$O:Si) in step (1) is in any suitable range or any range disclosed herein, e.g., from about 0.05:1 to about 1.95:1, from about 0.1:1 to about 1.8:1, from about 0.2:1 to about 1.5:1, from about 0.3:1 to about 1.2:1, from about 0.05:1 to about 0.95:1, from about 0.1:1 to about 0.9:1, from about 0.2:1 to about 0.8:1, from about 0.3:1 to about 0.7:1, etc.

Aspect 5. The process defined in any one of the preceding aspects, wherein the solvent is any suitable solvent or any solvent disclosed herein, e.g., the solvent is miscible with oil and water.

Aspect 6. The process defined in any one of the preceding aspects, wherein the solvent comprises a ketone (e.g., acetone), an alcohol (e.g., methanol, ethanol, n-propanol, isopropanol, etc.), a glycol, an ester, an ether, acetonitrile, etc., or any combination thereof.

Aspect 7. The process defined in any one of the preceding aspects, wherein the silicon compound comprises any suitable silicon compound or any silicon compound disclosed herein, e.g., a silicon alkoxide (e.g., tetraethyl orthosilicate), a silicon halide, a silicon hydride, a silane, a hydrocarbyl silane, a siloxane, etc., or any combination thereof.

Aspect 8. The process defined in any one of aspects 1-7, wherein the silicon compound, water, and the acid are contacted in the solvent in step (1), and the acid is any suitable acid or any acid disclosed herein, e.g., sulfuric acid, nitric acid, hydrochloric acid, hydrobromic acid, perchloric acid, sulfamic acid, etc., or any combination thereof.

Aspect 9. The process defined in any one of aspects 1-7, wherein the silicon compound, water, and the base are contacted in the solvent in step (1), and the base is any suitable base or any base disclosed herein, e.g., ammonia, ammonium hydroxide, sodium hydroxide, magnesium hydroxide, an alkyl-substituted ammonium hydroxide, an organic amine, etc., or any combination thereof.

Aspect 10. The process defined in any one of the preceding aspects, wherein a weight ratio of the acid or base to solvent (acid:solvent or base:solvent) in step (1) is in any suitable range or any range disclosed herein, e.g., from about 1:5000 to about 1:10, from about 1:2000 to about 1:20, from about 1:1000 to about 1:100, less than or equal to about 1:20, less than or equal to about 1:50, less than or equal to about 1:100, etc.

Aspect 11. The process defined in any one of the preceding aspects, wherein step (1) is conducted at any suitable temperature or a temperature in any range disclosed herein, e.g., from about 5° C. to about 80° C., from about 15° C. to about 60° C., from about 20° C. to about 50° C., etc.

Aspect 12. The process defined in any one of the preceding aspects, wherein a molar ratio of titanium to silicon (Ti:Si) in step (2) is in any suitable range or any range disclosed herein, e.g., from about 0.1:1 to about 5:1, from about 0.1:1 to about 2:1, from about 0.2:1 to about 3:1, from about 0.3:1 to about 2:1, from about 0.3:1 to about 1:1, from about 0.2:1 to about 0.9:1, etc.

Aspect 13. The process defined in any one of the preceding aspects, wherein the titanium compound comprises any suitable titanium compound or any titanium compound disclosed herein, e.g., a Ti (III) compound, a Ti (IV) compound, etc., or any combination thereof.

Aspect 14. The process defined in any one of the preceding aspects, wherein the titanium compound comprises any suitable titanium compound or any titanium compound disclosed herein, e.g., a titanium alkoxide (e.g., titanium isopropoxide, titanium n-propoxide), a titanium halide, a titanium acetylacetonate, etc., or any combination thereof.

Aspect 15. The process defined in any one of the preceding aspects, wherein step (2) is conducted at any suitable temperature or a temperature in any range disclosed herein, e.g., from about 5° C. to about 80° C., from about 15° C. to about 60° C., from about 20° C. to about 50° C., etc.

Aspect 16. The process defined in any one of the preceding aspects, wherein the second solution containing the titanium-silicon complex does not contain a precipitate.

Aspect 17. A water-soluble titanium-silicon complex prepared by the process defined in any one of aspects 1-16.

Aspect 18. The process defined in any one of aspects 1-16, wherein the process further comprises a step of combining additional water and at least a portion of the second solution containing the titanium-silicon complex to form a water-soluble titanium-silicon complex.

Aspect 19. The process defined in aspect 18, wherein the amount of additional water is an amount sufficient for complete hydrolysis of the titanium-silicon complex.

Aspect 20. The process defined in aspect 18, wherein a molar ratio of additional water to silicon ($H_2O$:Si) in the combining step is in any suitable range or any range disclosed herein, e.g., at least about 1:1, at least about 1.5:1, at least about 2:1, at least about 4:1, at least about 7:1, at least about 10:1, etc.

Aspect 21. A water-soluble titanium-silicon complex prepared by the process defined in any one of aspects 18-20.

Aspect 22. The process defined in any one of aspects 1-16 or 18-20, further comprising a step of (3) combining (mixing or slurrying) (in any order) at least a portion of the second solution containing the titanium-silicon complex, a solid support, and optionally, additional water, and drying to form a titanated solid support.

Aspect 23. A process comprising combining (mixing or slurrying) (in any order) the water-soluble titanium-silicon complex defined in aspect 17 or 21, a solid support, and optionally, additional water, and drying to form a titanated solid support.

Aspect 24. The process defined in aspect 22 or 23, wherein the titanium-silicon complex is combined first with the solid support, followed by the additional water.

Aspect 25. The process defined in aspect 22 or 23, wherein the titanium-silicon complex is combined first with the additional water, followed by the solid support.

Aspect 26. The process defined in any one of aspects 22-25, wherein the amount of additional water added is an amount sufficient for complete hydrolysis of the titanium-silicon complex.

Aspect 27. The process defined in any one of aspects 22-26, wherein a molar ratio of additional water to silicon ($H_2O$:Si) in the combining step is in any suitable range or any range disclosed herein, e.g., at least about 1:1, at least about 1.5:1, at least about 2:1, at least about 4:1, at least about 7:1, at least about 10:1, etc.

Aspect 28. The process defined in any one of aspects 22-27, wherein the combining step is conducted at any suitable temperature or a temperature in any range disclosed herein, e.g., from about 5° C. to about 80° C., from about 15° C. to about 60° C., from about 20° C. to about 50° C., etc.

Aspect 29. The process defined in any one of aspects 22-28, wherein the combining step does not result in precipitation of the titanium-silicon complex.

Aspect 30. The process defined in any one of aspects 22-29, wherein the solid support comprises any suitable solid oxide or any solid oxide disclosed herein, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, silica-boria, aluminophosphate-silica, titania-zirconia, etc., or any combination thereof.

Aspect 31. The process defined in any one of aspects 22-29, wherein the solid support comprises silica, silica-alumina, silica-coated alumina, silica-titania, silica-titania-magnesia, silica-zirconia, silica-magnesia, silica-boria, aluminophosphate-silica, etc., or any combination thereof.

Aspect 32. The process defined in any one of aspects 22-29, wherein the solid support is silica.

Aspect 33. The process defined in any one of aspects 22-29, wherein the solid support comprises a zeolite.

Aspect 34. The process defined in any one of aspects 22-33, wherein the amount of titanium in the titanated solid support is any suitable amount or an amount in any range disclosed herein, e.g., from about 0.1 to about 20 wt. %, from about 0.5 to about 15 wt. %, from about 1 to about 10 wt. %, from about 1 to about 6 wt. %, etc., based on the total weight of the titanated solid support.

Aspect 35. The process defined in any one of aspects 22-34, wherein drying comprises spray drying.

Aspect 36. The process defined in any one of aspects 22-35, further comprising a step of (4) calcining the titanated solid support.

Aspect 37. The process defined in any one of aspects 22-36, wherein the titanated solid support has a pore volume (total) in any suitable range, or any range disclosed herein, e.g., from about 0.5 to about 5 mL/g, from about 1 to about 5 mL/g, from about 1 to about 3 mL/g, from about 1.2 to about 2.5 mL/g, etc.

Aspect 38. The process defined in any one of aspects 22-37, wherein the titanated solid support has a BET surface area in any suitable range, or any range disclosed herein, e.g., from about 200 to about 700 m$^2$/g, from about 250 to about 550 m$^2$/g, from about 275 to about 525 m$^2$/g, etc.

Aspect 39. The process defined in any one of aspects 22-38, wherein the titanated solid support has an average (d50) particle size in any suitable range, or any range disclosed herein, e.g., from about 10 to about 500 microns, from about 25 to about 250 microns, from about 40 to about 160 microns, etc.

Aspect 40. A titanated solid support prepared by the process defined in any one of aspects 22-39.

Aspect 41. The process defined in any one of aspects 1-39, wherein step (1) comprises contacting the silicon compound, water, the acid or the base, and a chromium-containing compound in the solvent.

Aspect 42. The process defined in any one of aspects 1-39, wherein step (2) comprises contacting the titanium compound and a chromium-containing compound with the first solution containing the partially-hydrolyzed silicon material.

Aspect 43. The process defined in any one of aspects 22-39, wherein step (3) comprises combining (in any order) a chromium-containing compound, at least a portion of the second solution containing the titanium-silicon complex, a solid support, and optionally, additional water, and drying.

Aspect 44. A process comprising combining the titanated solid support defined in aspect 40 and a chromium-containing compound, in water, and drying.

Aspect 45. The process defined in any one of aspects 41-44, wherein the chromium-containing compound comprises any suitable chromium (II) compound or any chromium (II) compound disclosed herein, e.g., chromium (II) acetate, chromium (II) chloride, chromium (II) bromide, chromium (II) iodide, chromium (II) sulfate, etc., or any combination thereof.

Aspect 46. The process defined in any one of aspects 41-44, wherein the chromium-containing compound comprises any suitable chromium (III) compound or any chromium (III) compound disclosed herein, e.g., a chromium (III) carboxylate, a chromium (III) napthenate, a chromium (III) halide, chromium (III) sulfate, chromium (III) nitrate, a chromium (III) dionate, etc., or any combination thereof.

Aspect 47. The process defined in any one of aspects 41-44, wherein the chromium-containing compound comprises any suitable chromium (III) compound or any chromium (III) compound disclosed herein, e.g., chromium (III) acetate, chromium (III) acetylacetonate, chromium (III) chloride, chromium (III) bromide, chromium (III) sulfate, chromium (III) nitrate, etc., or any combination thereof.

Aspect 48. The process defined in any one of aspects 41-44, wherein the chromium-containing compound is soluble in the solvent.

Aspect 49. The process defined in aspect 48, wherein the chromium-containing compound comprises any suitable chromium-containing compound or any chromium-containing compound disclosed herein, e.g., tertiary butyl chromate, a diarene chromium (0) compound, bis-cyclopentadienyl chromium (II), chromium (III) acetylacetonate, chromium acetate, etc., or any combination thereof.

Aspect 50. The process defined in any one of aspects 41-44, wherein the chromium-containing compound is soluble in water.

Aspect 51. The process defined in aspect 50, wherein the chromium-containing compound comprises any suitable chromium-containing compound or any chromium-containing compound disclosed herein, e.g., chromium trioxide, chromium acetate, chromium nitrate, etc., or any combination thereof.

Aspect 52. A titanated chromium supported catalyst produced by the process defined in any one of aspects 41-51.

Aspect 53. The process defined in any one of aspects 1-16 or 18-20, further comprising a step of (3) combining (mixing or slurrying) (in any order) at least a portion of the second solution containing the titanium-silicon complex, a supported chromium catalyst, and optionally, additional water, and drying.

Aspect 54. A process comprising combining (mixing or slurrying) (in any order) the water-soluble titanium-silicon complex defined in aspect 17 or 21, a supported chromium catalyst, and optionally, additional water, and drying.

Aspect 55. The process defined in aspect 53 or 54, wherein the titanium-silicon complex is combined first with the supported chromium catalyst, followed by the additional water.

Aspect 56. The process defined in aspect 53 or 54, wherein the titanium-silicon complex is combined first with the additional water, followed by the supported chromium catalyst.

Aspect 57. The process defined in any one of aspects 53-56, wherein the amount of additional water added is an amount sufficient for complete hydrolysis of the titanium-silicon complex.

Aspect 58. The process defined in any one of aspects 53-57, wherein a molar ratio of additional water to silicon ($H_2O$:Si) in the combining step is in any suitable range, or any range disclosed herein, e.g., at least about 1:1, at least about 1.5:1, at least about 2:1, at least about 4:1, at least about 7:1, at least about 10:1, etc.

Aspect 59. The process defined in any one of aspects 53-58, wherein the combining step is conducted at any suitable temperature or a temperature in any range disclosed herein, e.g., from about 5° C. to about 80° C., from about 15° C. to about 60° C., from about 20° C. to about 50° C., etc.

Aspect 60. The process defined in any one of aspects 53-59, wherein the combining step does not result in precipitation of the titanium-silicon complex.

Aspect 61. The process defined in any one of aspects 53-60, wherein drying comprises spray drying.

Aspect 62. The process defined in any one of aspects 53-61, wherein the supported chromium catalyst comprises chromium/silica, chromium/silica-titania, chromium/silica-titania-magnesia, chromium/silica-alumina, chromium/silica-coated alumina, chromium/aluminophosphate, etc., or any combination thereof.

Aspect 63. A titanated chromium supported catalyst produced by the process defined in any one of aspects 53-62.

Aspect 64. A process comprising thermally treating the titanated chromium supported catalyst defined in aspect 52 or 63.

Aspect 65. An activated titanated chromium supported catalyst produced by the process defined in aspect 64.

Aspect 66. The process defined in any one of aspects 1-39, further comprising a step of contacting the titanated solid support with a chromium-containing compound (e.g., chromium (III) acetate, basic chromium (III) acetate, chromium (III) acetylacetonate, $Cr_2(SO_4)_3$, $Cr(NO_3)_3$, and/or $CrO_3$) while thermally treating to form an activated titanated chromium supported catalyst.

Aspect 67. An activated titanated chromium supported catalyst produced by the process defined in aspect 66.

Aspect 68. The process defined in aspect 64 or 66, wherein thermally treating comprises any suitable temperature and time conditions or any temperature and time conditions disclosed herein, e.g., from about 400° C. to about 1000° C., from about 500° C. to about 900° C., from about 550° C. to about 850° C., etc., for a time period of from about 1 min to about 24 hr, from about 1 hr to about 12 hr, from about 30 min to about 8 hr, etc.

Aspect 69. The catalyst defined in any one of aspects 52, 63, 65, or 67, wherein the amount of chromium in the catalyst is any suitable amount or an amount in any range disclosed herein, e.g., from about 0.1 to about 20 wt. %, from about 0.5 to about 15 wt. %, from about 0.5 to about 10 wt. %, from about 1 to about 6 wt. %, etc., based on the total weight of the catalyst.

Aspect 70. The catalyst defined in aspect 69, wherein the amount of titanium in the catalyst is any suitable amount or an amount in any range disclosed herein, e.g., from about 0.1 to about 20 wt. %, from about 0.5 to about 15 wt. %, from about 1 to about 10 wt. %, from about 1 to about 6 wt. %, etc., based on the total weight of the catalyst.

Aspect 71. The catalyst defined in aspect 69 or 70, wherein the catalyst has a pore volume (total) in any suitable range, or any range disclosed herein, e.g., from about 0.5 to about 5 mL/g, from about 1 to about 5 mL/g, from about 1 to about 3 mL/g, from about 1.2 to about 2.5 mL/g, etc.

Aspect 72. The catalyst defined in any one of aspects 69-71, wherein the catalyst has a BET surface area in any suitable range, or any range disclosed herein, e.g., from about 200 to about 700 m²/g, from about 250 to about 550 m²/g, from about 275 to about 525 m²/g, etc.

Aspect 73. The catalyst defined in any one of aspects 69-72, wherein the catalyst has an average (d50) particle size in any suitable range, or any range disclosed herein, e.g., from about 10 to about 500 microns, from about 25 to about 250 microns, from about 40 to about 160 microns, etc.

Aspect 74. The catalyst defined in any one of aspects 69-73, wherein the catalyst contains less than or equal to about 3 wt. % carbon, less than or equal to about 2 wt. % carbon, less than or equal to about 1 wt. % carbon, less than or equal to about 0.5 wt. % carbon, etc.

Aspect 75. An olefin polymerization process, the process comprising contacting the activated titanated chromium supported catalyst defined in any one of aspects 69-74 and an optional co-catalyst with an olefin monomer and an optional olefin comonomer in a polymerization reactor system under polymerization conditions to produce an olefin polymer.

Aspect 76. The olefin polymerization process defined in aspect 75, wherein a co-catalyst is used, and the co-catalyst comprises any suitable co-catalyst or any co-catalyst disclosed herein, e.g., an aluminoxane co-catalyst, an organoaluminum co-catalyst, an organoboron co-catalyst, etc., or any combination thereof.

Aspect 77. The olefin polymerization process defined in aspect 75 or 76, wherein the olefin monomer comprises any olefin monomer disclosed herein, e.g., any $C_2$-$C_{20}$ olefin.

Aspect 78. The olefin polymerization process defined in any one of aspects 75-77, wherein the olefin monomer and the optional olefin comonomer independently comprise a $C_2$-$C_{20}$ alpha-olefin.

Aspect 79. The olefin polymerization process defined in any one of aspects 75-77, wherein the olefin monomer comprises ethylene.

Aspect 80. The olefin polymerization process defined in any one of aspects 75-79, wherein the catalyst is contacted with ethylene and an olefin comonomer comprising a $C_3$-$C_{10}$ alpha-olefin.

Aspect 81. The olefin polymerization process defined in any one of aspects 75-80, wherein the catalyst is contacted with ethylene and an olefin comonomer comprising 1-butene, 1-hexene, 1-octene, or a mixture thereof.

Aspect 82. The olefin polymerization process defined in any one of aspects 75-78, wherein the olefin monomer comprises propylene.

Aspect 83. The olefin polymerization process defined in any one of aspects 75-82, wherein the polymerization reactor system comprises a batch reactor, a slurry reactor, a gas-phase reactor, a solution reactor, a high pressure reactor, a tubular reactor, an autoclave reactor, or a combination thereof.

Aspect 84. The olefin polymerization process defined in any one of aspects 75-83, wherein the polymerization reactor system comprises a slurry reactor, a gas-phase reactor, a solution reactor, or a combination thereof.

Aspect 85. The olefin polymerization process defined in any one of aspects 75-84, wherein the polymerization reactor system comprises a loop slurry reactor.

Aspect 86. The olefin polymerization process defined in any one of aspects 75-85, wherein the polymerization reactor system comprises a single reactor.

Aspect 87. The olefin polymerization process defined in any one of aspects 75-85, wherein the polymerization reactor system comprises 2 reactors.

Aspect 88. The olefin polymerization process defined in any one of aspects 75-85, wherein the polymerization reactor system comprises more than 2 reactors.

Aspect 89. The olefin polymerization process defined in any one of aspects 75-88, wherein the olefin polymer comprises any olefin polymer disclosed herein.

Aspect 90. The olefin polymerization process defined in any one of aspects 75-81 or 83-89, wherein the olefin polymer comprises an ethylene homopolymer, an ethylene/1-butene copolymer, an ethylene/1-hexene copolymer, and/or an ethylene/1-octene copolymer.

Aspect 91. The olefin polymerization process defined in any one of aspects 75-78 and 82-89, wherein the olefin polymer comprises a polypropylene homopolymer and/or a propylene-based copolymer.

Aspect 92. The olefin polymerization process defined in any one of aspects 75-91, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 93. The olefin polymerization process defined in any one of aspects 75-92, wherein the polymerization conditions are substantially constant, e.g., for a particular polymer grade.

Aspect 94. The olefin polymerization process defined in any one of aspects 75-93, wherein no hydrogen is added to the polymerization reactor system.

Aspect 95. The olefin polymerization process defined in any one of aspects 75-93, wherein hydrogen is added to the polymerization reactor system.

Aspect 96. The olefin polymerization process defined in any one of aspects 75-95, wherein the olefin polymer has a density in any range disclosed herein, e.g., from about 0.90 to about 0.97, from about 0.92 to about 0.96, from about 0.93 to about 0.955, from about 0.94 to about 0.955 g/cm³, etc.

Aspect 97. The olefin polymerization process defined in any one of aspects 75-96, wherein the olefin polymer has a HLMI in any range disclosed herein, e.g., from about 1 to about 80, from about 3 to about 50, from about 8 to about 60, from about 6 to about 40 g/10 min, etc.

Aspect 98. The olefin polymerization process defined in any one of aspects 75-97, wherein the olefin polymer has a ratio of Mw/Mn in any range disclosed herein, e.g., from about 5 to about 40, from about 10 to about 25, from about 15 to about 35, etc.

Aspect 99. The olefin polymerization process defined in any one of aspects 75-98, wherein the olefin polymer has a ratio of $I_{21}/I_{10}$ in any range disclosed herein, e.g., from about 3 to about 8, from about 4 to about 9, from about 5 to about 7, etc.

Aspect 100. An olefin polymer produced by the olefin polymerization process defined in any one of aspects 75-99.

Aspect 101. An article of manufacture comprising the polymer defined in aspect 100.

Aspect 102. The article defined in aspect 101, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

Aspect 103. A titanated chromium supported catalyst comprising a solid support and from about 0.1 to about 15 wt. % chromium, from about 1 to about 10 wt. % titanium, and less than or equal to about 3 wt. % carbon, based on the total weight of the catalyst; wherein at least about 75 wt. % of the chromium is present in an oxidation state of three or less.

Aspect 104. The catalyst defined in aspect 103, wherein the catalyst contains any suitable amount of chromium or an amount in any range disclosed herein, e.g., from about 0.5 to about 15 wt. %, from about 0.5 to about 5 wt. %, from about 0.5 to about 2.5 wt. %, etc., based on the total weight of the catalyst.

Aspect 105. The catalyst defined in aspect 103 or 104, wherein the catalyst contains any suitable amount of titanium or an amount in any range disclosed herein, e.g., from about 1 to about 8 wt. %, from about 1 to about 6 wt. %, from about 1.5 to about 5 wt. %, etc., based on the total weight of the catalyst.

Aspect 106. The catalyst defined in any one of aspects 103-105, wherein the catalyst contains less than or equal to about 2 wt. % carbon, less than or equal to about 1 wt. % carbon, less than or equal to about 0.5 wt. % carbon, etc.

Aspect 107. The catalyst defined in any one of aspects 103-106, wherein the catalyst has a pore volume (total) in any suitable range, or any range disclosed herein, e.g., from about 0.5 to about 5 mL/g, from about 1 to about 5 mL/g, from about 1 to about 4 mL/g, from about 1.2 to about 2.5 mL/g, etc.

Aspect 108. The catalyst defined in any one of aspects 103-107, wherein the catalyst has a BET surface area in any suitable range, or any range disclosed herein, e.g., from about 200 to about 700 m$^2$/g, from about 200 to about 550 m$^2$/g, from about 275 to about 525 m$^2$/g, etc.

Aspect 109. The catalyst defined in any one of aspects 103-108, wherein the catalyst has an average (d50) particle size in any suitable range, or any range disclosed herein, e.g., from about 10 to about 500 microns, from about 25 to about 250 microns, from about 40 to about 160 microns, etc.

Aspect 110. The catalyst defined in any one of aspects 103-109, wherein at least about 80 wt. %, at least about 90 wt. %, at least about 95 wt. %, etc., of the chromium is present in an oxidation state of three or less.

Aspect 111. The catalyst defined in any one of aspects 103-110, wherein the solid support comprises any suitable solid oxide or any solid oxide disclosed herein, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, silica-boria, aluminophosphate-silica, titania-zirconia, etc., or any combination thereof.

We claim:

1. A titanated chromium supported catalyst comprising:
a solid support; and
from about 0.5 to about 15 wt. % chromium, from about 1 to about 10 wt. % titanium on a surface of the solid support, and less than or equal to about 1 wt. % carbon, based on the total weight of the catalyst;
wherein at least about 90 wt. % of the chromium is present in an oxidation state of three or less; and
wherein the titanated chromium supported catalyst is characterized by:
a total pore volume from about 0.5 to about 5 mL/g;
a BET surface area from about 200 to about 700 m$^2$/g; and
a d50 average particle size from about 10 to about 500 microns.

2. The titanated chromium supported catalyst of claim 1, wherein:
the solid support is silica; and
the catalyst contains from about 0.5 to about 2.5 wt. % chromium, from about 1 to about 6 wt. % titanium on the surface of the silica, and less than or equal to about 0.5 wt. % carbon, based on the total weight of the catalyst.

3. A titanated chromium supported catalyst comprising:
a solid support; and
from about 0.1 to about 15 wt. % chromium, from about 1 to about 10 wt. % titanium on a surface of the solid support, and less than or equal to about 1 wt. % carbon, based on the total weight of the catalyst;
wherein at least about 80 wt. % of the chromium is present in an oxidation state of three or less.

4. The titanated chromium supported catalyst of claim 3, wherein the catalyst contains from about 0.5 to about 5 wt. % chromium, from about 1 to about 6 wt. % titanium on the surface of the solid support, and less than or equal to about 0.5 wt. % carbon.

5. The titanated chromium supported catalyst of claim 3, wherein at least about 90 wt. % of the chromium is present in an oxidation state of three or less.

6. The titanated chromium supported catalyst of claim 3, wherein the catalyst is a titanated chromium/silica catalyst.

7. The titanated chromium supported catalyst of claim 3, wherein the catalyst is characterized by:
a total pore volume from about 0.5 to about 5 mL/g;
a BET surface area from about 200 to about 700 m$^2$/g; and
a d50 average particle size from about 10 to about 500 microns.

8. The titanated chromium supported catalyst of claim 3, wherein the solid support is silica, silica-alumina, silica-coated alumina, silica-titania, silica-titania-magnesia, silica-zirconia, silica-magnesia, silica-boria, aluminophosphate-silica, or any combination thereof.

9. The titanated chromium supported catalyst of claim 8, wherein at least about 90 wt. % of the chromium is present in an oxidation state of three or less.

10. The titanated chromium supported catalyst of claim 8, wherein the catalyst is characterized by:
a total pore volume from about 1 to about 4 mL/g;
a BET surface area from about 200 to about 550 m$^2$/g; and
a d50 average particle size from about 10 to about 500 microns.

11. The titanated chromium supported catalyst of claim 10, wherein the catalyst contains from about 0.5 to about 5 wt. % chromium, and from about 1 to about 6 wt. % titanium on the surface of the solid support.

12. The titanated chromium supported catalyst of claim 3, wherein the catalyst contains from about 87 to about 98 wt. % of the solid support.

13. The titanated chromium supported catalyst of claim 12, wherein the solid support is silica.

14. A titanated chromium/silica catalyst comprising:
silica; and
from about 0.1 to about 15 wt. % chromium, from about 1 to about 10 wt. % titanium on a surface of the silica, and less than or equal to about 1 wt. % carbon, based on the total weight of the catalyst;
wherein at least about 75 wt. % of the chromium is present in an oxidation state of three or less.

15. The titanated chromium/silica catalyst of claim 14, wherein the catalyst contains from about 92 to about 98 wt. % silica.

16. The titanated chromium/silica catalyst of claim 14, wherein the catalyst contains from about 0.5 to about 5 wt.

% chromium, from about 1 to about 6 wt. % titanium on the surface of the silica, and less than or equal to about 0.5 wt. % carbon.

17. The titanated chromium/silica catalyst of claim 16, wherein the catalyst contains from about 87 to about 98 wt. % silica, and at least about 90 wt. % of the chromium is present in an oxidation state of three or less.

18. The titanated chromium/silica catalyst of claim 14, wherein the catalyst is characterized by:
   a total pore volume from about 0.5 to about 5 mL/g;
   a BET surface area from about 200 to about 700 $m^2/g$; and
   a d50 average particle size from about 10 to about 500 microns.

19. The titanated chromium/silica catalyst of claim 14, wherein the catalyst contains from about 0.5 to about 5 wt. % chromium.

20. The titanated chromium/silica catalyst of claim 19, wherein the catalyst contains less than or equal to about 0.5 wt. % carbon, and at least about 95 wt. % of the chromium is present in an oxidation state of three or less.

* * * * *